United States Patent
Gruner-Nielsen et al.

(10) Patent No.: US 9,502,852 B2
(45) Date of Patent: Nov. 22, 2016

(54) FIBER DESIGNS FOR WAVELENGTH TUNABLE ULTRA-SHORT PULSE LASERS

(71) Applicant: OFS Fitel, LLC, Norcross, GA (US)

(72) Inventors: Lars Gruner-Nielsen, Copenhagen (DK); Dan P Jakobsen, Copenhagen (DK); Martin E. V. Pedersen, Copenhagen (DK); Chris Xu, Ithaca, NY (US); Ji Cheng, Ithaca, NY (US)

(73) Assignee: OFS FITEL, LLC, Norcross, GA (US)

( * ) Notice: Subject to any disclaimer, the term of this patent is extended or adjusted under 35 U.S.C. 154(b) by 0 days.

(21) Appl. No.: 14/349,269

(22) PCT Filed: Oct. 9, 2012

(86) PCT No.: PCT/US2012/059386
§ 371 (c)(1),
(2) Date: Apr. 2, 2014

(87) PCT Pub. No.: WO2013/052968
PCT Pub. Date: Apr. 11, 2013

(65) Prior Publication Data
US 2014/0254616 A1    Sep. 11, 2014

Related U.S. Application Data

(60) Provisional application No. 61/544,034, filed on Oct. 6, 2011.

(51) Int. Cl.
*H01S 3/108* (2006.01)
*H01S 3/067* (2006.01)
(Continued)

(52) U.S. Cl.
CPC ........... *H01S 3/067* (2013.01); *G02B 6/03688* (2013.01); *G02B 6/14* (2013.01); *H01S 3/0057* (2013.01); *H01S 3/0675* (2013.01);
(Continued)

(58) Field of Classification Search
CPC ........ H01S 3/108; H01S 3/1086; H01S 3/30; H01S 3/302; H01S 3/067–3/06795
See application file for complete search history.

(56) References Cited

U.S. PATENT DOCUMENTS 6,381,391 B1 *   4/2002   Islam et al. ................... 385/123
6,618,531 B1 *   9/2003   Goto et al. .................... 385/122
(Continued)

FOREIGN PATENT DOCUMENTS

FR    2966291 A1 *   4/2012   ............. H01S 3/067
JP    06138500 A  *   5/1994   ............... G02F 1/35
(Continued)

*Primary Examiner* — Joshua King
(74) *Attorney, Agent, or Firm* — Mandelbawm Salsburg

(57) ABSTRACT

Embodiments of the present invention generally relate to fiber designs for wavelength tunable ultra-short pulse lasers. More specifically, embodiments of the present invention relate to systems incorporating fiber designs for higher order mode fibers capable of soliton self frequency shifting where a system comprises a first fiber for shifting the wavelength from a pump wavelength to a transfer wavelength and a second fiber for shifting the pulse from the transfer wavelength to an output wavelength. In one embodiment of the present invention, a wavelength tunable short pulse fiber laser system comprises: a pulse generator for providing a pulse having an input wavelength; a mode-converter; a first designed fiber for shifting the pulse from the input wavelength to a transfer wavelength; and a second designed fiber for shifting the pulse from the transfer wavelength to an output wavelength.

4 Claims, 11 Drawing Sheets

(51) Int. Cl.
    *H01S 3/00*     (2006.01)
    *G02B 6/036*    (2006.01)
    *G02B 6/14*     (2006.01)
    *H01S 3/08*     (2006.01)

(52) U.S. Cl.
    CPC .......... *H01S3/06716* (2013.01); *H01S 3/0804* (2013.01); *H01S 2301/085* (2013.01)

(56) References Cited

U.S. PATENT DOCUMENTS

| | | | |
|---|---|---|---|
| 6,885,683 | B1* | 4/2005 | Fermann et al. ............... 372/25 |
| 7,821,704 | B1* | 10/2010 | Pepper et al. ................ 359/344 |
| 2002/0063947 | A1* | 5/2002 | Islam ........................... 359/334 |
| 2006/0109543 | A1* | 5/2006 | Bragheri et al. .............. 359/334 |
| 2007/0160092 | A1* | 7/2007 | Okuno ............... 372/6 |
| 2007/0206910 | A1* | 9/2007 | Ramachandran ............. 385/123 |
| 2008/0138011 | A1* | 6/2008 | Ramachandran ............. 385/27 |
| 2009/0034562 | A1* | 2/2009 | Nicholson et al. .............. 372/6 |
| 2009/0225793 | A1* | 9/2009 | Marciante et al. .............. 372/6 |
| 2010/0002992 | A1* | 1/2010 | Ramachandran ............. 385/27 |
| 2010/0142959 | A1* | 6/2010 | Futami et al. ................. 398/79 |
| 2010/0265971 | A1* | 10/2010 | Emori ................. 372/3 |
| 2012/0224597 | A1* | 9/2012 | Jespersen et al. ......... 372/29.02 |

FOREIGN PATENT DOCUMENTS

| | | | | |
|---|---|---|---|---|
| JP | 2008083118 A | * | 4/2008 | ............ G02F 1/365 |
| WO | WO 2005081430 A2 | * | 9/2005 | ............ H04B 10/00 |
| WO | WO 2008052153 A2 | * | 5/2008 | ............ G02F 1/035 |

* cited by examiner

FIBER DESIGNS FOR WAVELENGTH TUNABLE ULTRA-SHORT PULSE LASERS

CROSS-REFERENCE TO RELATED APPLICATIONS

The present application claims priority to U.S. Provisional Patent Application No. 61/544,034, entitled "Fiber designs for wavelength tunable ultra-short lasers," filed Oct. 6, 2011, the disclosure of which is incorporated by reference herein in its entirety.

BACKGROUND

1. Field of the Invention

Embodiments of the present invention generally relate to fiber designs for use in wavelength tunable ultra-short pulse lasers. More specifically, embodiments of the present invention relate to fiber designs for higher order mode fibers capable of soliton self frequency shifting where system utilizing such fibers has a first fiber for shifting the wavelength from a pump wavelength to a transfer wavelength and a second fiber for shifting the pulse from the transfer wavelength to an output wavelength.

2. Description of the Related Art

Soliton self frequency shifting (SSFS) in fibers with anomalous dispersion has proven to be an efficient method for wavelength shifting of ultra-short pulses (i.e., having a pulse width below about 1 ps). Anomalous dispersion is a requirement for sustaining a soliton pulse, and for wavelengths below 1300 nm, anomalous dispersion cannot be obtained in conventional single mode fibers. It is possible, however, to obtain anomalous dispersion in a wide wavelength range below 1300 nm using either index guided photonic crystal fibers, hollow core fibers, or fibers configured to propagate higher order modes (HOM).

To be suitable for some applications, e.g. for multi-photon imaging, the required pulse energy is generally in the nJ regime. Index guided photonic crystal fibers require very low pulse energies and SSFS in hollow core fibers requires very high pulse energies, rendering both unsuitable for such applications. However, HOM fibers may useful in such range of pulse energy.

The pulse energy required for a soliton pulse is given by:

$$E = \frac{KN^2 DA_{eff}}{T}$$

where T is the soliton pulse width, N is an integer defining the soliton order, D is the dispersion coefficient of the fiber, $A_{eff}$ is the effective area of the fiber and K is a constant.

HOM fibers can be designed with a specific dispersion coefficient and effective area, such that it is possible to tune the wavelength of the pulse by using SSFS. Current HOM fiber designs allowed for shifting from 1064 nm up to 1200 nm in the $LP_{02}$ mode, resulting in output pulses with an energy of about 0.8 nJ using SSFS. Further shifting up to 1350 nm may be achieved using a combination of SSFS and Cerenkov generation, the latter having an output pulse energy of about 0.66 nJ. In addition, shifting from 775 nm to 850 nm using a combination of SSFS and Cerenkov generation with an output pulse energy of 0.6 nJ has been demonstrated.

FIGS. 1A and 1B provide a reference to show effective indices as well as the dispersion coefficient and effective area, respectively, for a typical prior art HOM fiber for pumping at 1060 nm which yields Cerenkov generation at 1300 nm when pumped at 1060 nm. As shown, the only crossing between the effective index of the $LP_{02}$ mode and other modes happens at about 940 nm, well below operating wavelength range. Light in a HOM fiber where the light is in a mode having a mode-crossing with one or more other modes is generally not beneficial for any particular application. Such mode-crossing will likely introduce mode-coupling and distribute the power of the light between the involving modes and thereby prevent single mode operation at that particular wavelength. It is well known, the $D \cdot A_{eff}$ value for known HOM fiber designs at the pump wavelength is less than 3.0 fs.

As stated above, current HOM fiber designs have limited the pulse energy of the wavelength shifted pulse to just below 1 nJ. However, for practical applications, e.g. medical use with in-vivo measurements, pulse energies in the range 2-5 nJ are necessary. Accordingly, there is a need for an improved fiber design for wavelength tunable ultra-short pulse lasers.

SUMMARY

Embodiments of the present invention generally relate to fiber designs for wavelength tunable ultra-short pulse lasers. More specifically, embodiments of the present invention relate to systems incorporating fiber designs for higher order mode fibers capable of soliton self frequency shifting where a system comprises a first fiber for shifting the wavelength from a pump wavelength to a transfer wavelength and a second fiber for shifting the pulse from the transfer wavelength to an output wavelength.

In one embodiment of the present invention, a wavelength tunable short pulse fiber laser system comprises: a pulse generator for providing a pulse having an input wavelength; a mode-converter; a first designed fiber for shifting the pulse from the input wavelength to a transfer wavelength; and a second designed fiber for shifting the pulse from the transfer wavelength, to an output wavelength.

In another embodiment of the present invention, a wavelength tunable short pulse fiber laser system comprises: a mode-locked laser for providing a pulse having an input wavelength; a long period grating mode-converter; a first designed HOM fiber for shifting the pulse from the input wavelength to a transfer wavelength; and a second designed HOM fiber for shifting the pulse from the transfer wavelength to an output wavelength; wherein the first designed fiber uses a higher order mode having D·Aeff greater than 3 fs at the input wavelength.

In yet another embodiment of the present invention, a method of wavelength shifting ultra-short pulses comprises: providing a system comprising a pulse generator for providing a pulse having an input wavelength; a mode-converter fiber; a first designed fiber; and a second designed fiber; propagating the pulse from the pulse generator to the mode-converter fiber and converting the pulse from an input mode to a higher order mode; propagating the pulse from the mode-converter fiber to the first designed fiber and shifting the input wavelength to a transfer wavelength; and propagating the pulse from the first designed fiber and to the second designed fiber and shifting the transfer wavelength to an output wavelength.

BRIEF DESCRIPTION OF THE DRAWINGS

So the manner in which the above-recited features of the present invention can be understood in detail, a more particular description of embodiments of the present invention, briefly summarized above, may be had by reference to embodiments, which are illustrated in the appended drawings. It is to be noted, however, the appended drawings illustrate only typical embodiments of embodiments encompassed within the scope of the present invention, and, therefore, are not to be considered limiting, for the present invention may admit to other equally effective embodiments, wherein.

Figure 1A:
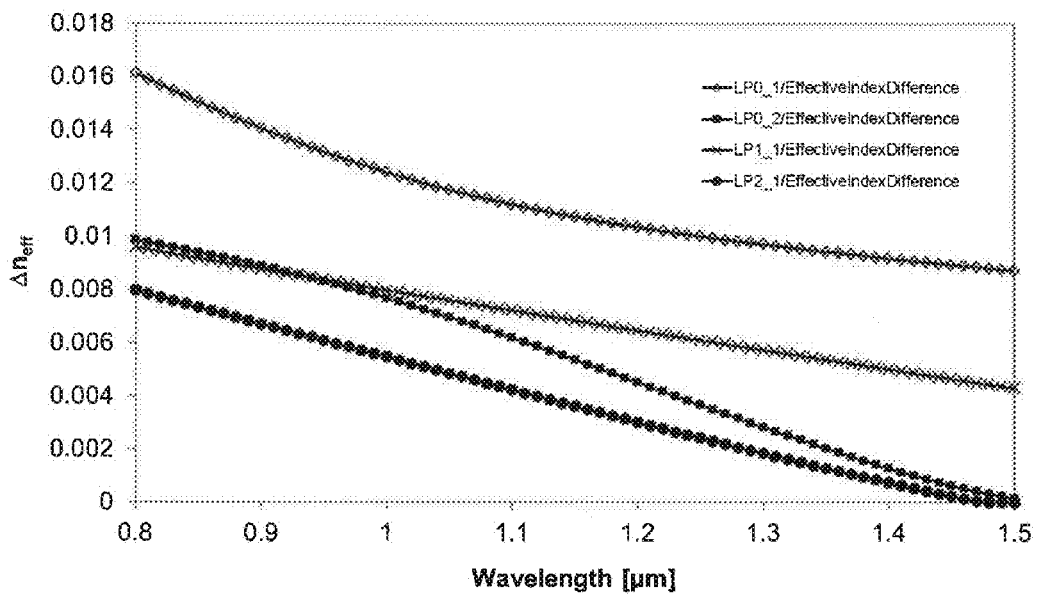
FIG. 1A depicts a graph showing effective indices of guided modes for a typical HOM fiber as known in the prior art.
Figure 1B:
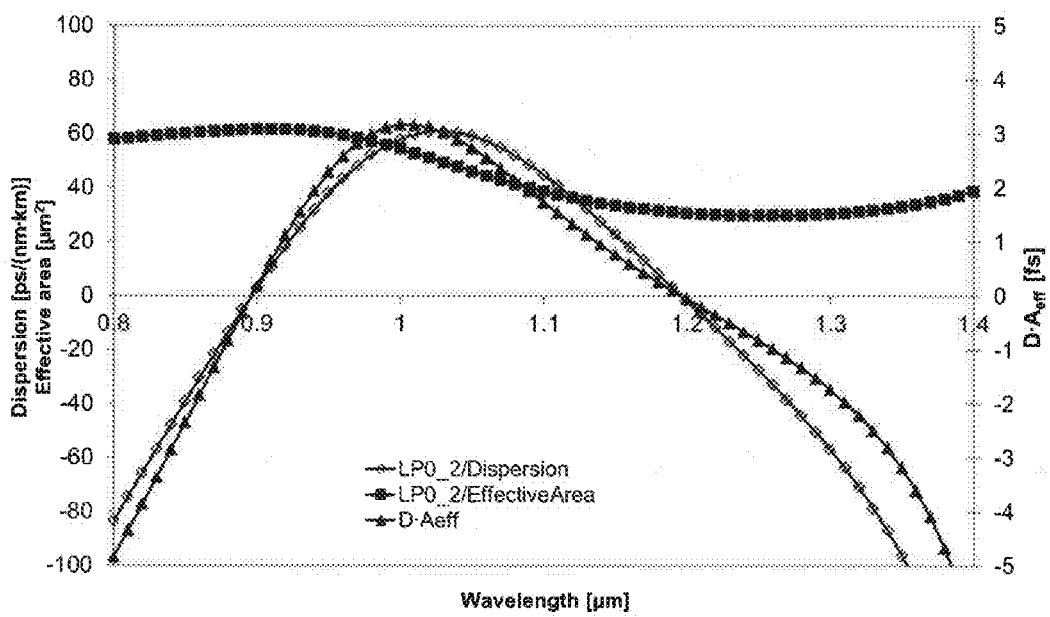
FIG. 1B depicts a graph showing dispersion and effective area for a typical HOM fiber as known in the prior art.

The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including but not limited to. To facilitate understanding, like reference numerals have been used, where possible, to designate like elements common to the figures.

DETAILED DESCRIPTION

Embodiments of the present invention generally relate to fiber designs for wavelength tunable ultra-short pulse lasers. More specifically, embodiments of the present invention relate to fiber designs for higher order mode fibers capable of soliton self frequency shifting where a system incorporating the inventive fibers comprises a first fiber for shifting the wavelength from the pump wavelength to a transfer wavelength and a second fiber for shifting the pulse from the transfer wavelength to an output wavelength.

As used herein, the term "about" or "approximately," or derivatives thereof, when referencing a numerical value, should be deemed to include within ten percent of such numerical value in either direction. In addition, when such terms are utilized to described absolutes (e.g., zero), the absolute should be deemed to include within one unit of reasonable measurement in either direction, as would ordinarily be used by those of ordinary skill in the art.

Embodiments of the present invention generally require the use of HOM fibers as explained in detail herein. As generally explained, the HOM fibers may be operating in the $LP_{02}$ mode. While the embodiments depicted may utilize the $LP_{02}$ mode, it should be appreciated that even higher order modes, e.g., $LP_{03}$, $LP_{04}$, $LP_{11}$, or $LP_{21}$ may be utilized in embodiments of the present invention. It is also appreciated, however, due to the significantly increased number of guided modes when going to modes higher than $LP_{02}$, additional problems associated with a significant increase in unwanted mode crossings may arise. Notwithstanding these issues, as one of ordinary skill would appreciate how to apply the scope of the discussed embodiments to additional embodiments, such additional embodiments should be deemed to encompass other higher order modes and should be included within the scope of all embodiments of the present invention.

Figure 2:
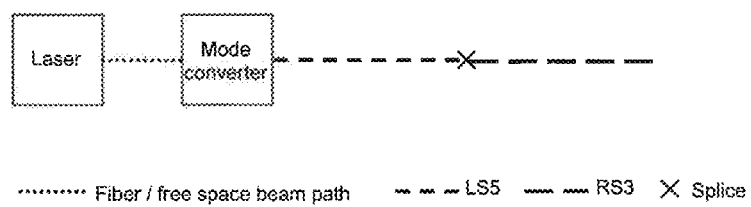
FIG. 2 depicts a schematic view of a wavelength tunable short pulse fiber laser system in accordance with one embodiment of the present invention.

FIG. 2 depicts a schematic view of a wavelength tunable short pulse fiber laser system in accordance with one embodiment of the present invention. The system generally comprises a laser source having a single mode fiber output, a mode-converter, a first designed fiber (also referenced herein as the "LS5" fiber), a second designed fiber (also referenced herein as the "RS3" fiber), and a splice between the first and second designed fibers. The splice may comprise a fusion splice, a mechanical splice or the like. Alternatively, the splice may comprise a lens coupling rather than a traditional splice.

In many embodiments, the mode-converter, the first designed fiber and the second designed fiber are each different HOM fibers. However, in alternative embodiments, the methods and systems of embodiments of the present invention may utilize a single specialized HOM fiber, a pair of specialized HOM fibers, or more than three fibers, to achieve suitable alternative embodiments.

The laser source may comprise any laser source or pulse generator suitable for embodiments of the present invention. In many embodiments, the laser source comprises a mode-locked laser, for example, an 70-90 MHz Ti:Sapphire mode-locked laser. In one embodiment, the laser source is capable of generating an initial input wavelength between about 650 nm and 1100 nm having a pulse duration between 5 fs and to a few ps. Output power up to 4.0 W is available.

In many embodiments, the pulse from the laser source enters the single mode fiber which is coupled to a HOM fiber acting as a mode-converter fiber. In one embodiment the mode-converter fiber comprises an HOM fiber used as a long period grating (LPG) mode-converter. In alternative embodiments, any type of mode-converter may be utilized.

The mode-converter fiber is spliced into the first designed fiber as shown in the Figure. The first designed fiber generally acts to generate a soliton and uses SSFS to shift the light pulse from an input wavelength from the laser source to a transfer wavelength (also called a "shift wavelength") between the first designed fiber and the second designed fiber. As introduced above, the first designed fiber and the second designed fiber are generally HOM fibers, but may also be the same specially designed HOM fiber.

The shift wavelength may comprise any wavelength higher than the pump wavelength provided there is no mode-crossing with another mode within this wavelength interval. Aside from mode-crossing, the shift wavelength may also be limited by a requirement that the dispersion remain anomalous throughout the SSFS process. Moreover, to further limit the shift wavelength, the $D \cdot A_{eff}$ mismatch between the first designed fiber and the second designed fiber should remain less than a factor of 100 (i.e., the soliton order mismatch <10).

In considering the above operational parameters, the desired index profile for each of the first designed fiber and second designed fiber can be constructed. Regarding the index profile of the first designed fiber, such a fiber comprises a central core, an inner trench surrounding the core, a ring surrounding the trench, an outer trench surrounding the ring, and an outer cladding.

In some embodiments, the central core of the first designed fiber may generally have a raised index region, having a radius of between about 0.75 µm to about 2.0 µm, and having an index difference to the outer cladding of between about 20.0 to about 40.0 (measured in $10^{-3}$). In one exemplary embodiment, the central core may comprise $SiO_2$ doped with an appropriate amount of $GeO_2$ to achieve a desired index, but may comprise other dopants.

The inner trench may be a depressed index region, having a width of between about 1.75 µm to 2.5 µm, and having an index difference to the outer cladding of between about −3.0 to about −13.0 (measured in $10^{-3}$). The inner trench may generally comprise $SiO_2$ doped with the appropriate amount of F, and optionally $GeO_2$, to achieve a desired index.

The ring may be a raised index region, having a width of between about 2.0 µm to 5.0 µm, and having an index difference to the outer cladding of between about 5.0 to about 20.0 (measured in $10^{-3}$). The ring may generally comprise $SiO_2$ doped with the appropriate amount of $GeO_2$, and optionally F, to achieve a desired index.

The outer trench generally has a width of between about 1.75 µm to 4.5 µm, and has an index difference to the outer cladding of between about 1.5 to about −3.5 (measured in $10^{-3}$). The outer trench may generally comprise $SiO_2$ doped with the appropriate amount of $P_2O_5$, F, and optionally $GeO_2$, to achieve a desired index.

In many embodiments, the outer cladding comprises $SiO_2$, and has an outer radius of between about 50 µm to about 75 µm.

The specific design of one exemplary first designed fiber is shown in Table 1 below:

TABLE 1

Exemplary First Designed Fiber
The LS5 fiber

| Region | Dimension | Index difference to outer cladding |
|---|---|---|
| Core | Radius = 125 µm | $\Delta n = 28.5 \cdot 10^{-3}$ |
| Trench | Width = 2.09 µm | $\Delta n = -5.9 \cdot 10^{-3}$ |
| Ring | Width = 3.51 µm | $\Delta n = 10.5 \cdot 10^{-3}$ |
| Cladding | Width = 2.84 µm | $\Delta n = -0.5 \cdot 10^{-3}$ |
| Outer Cladding | Radius = 62.5 µm | $\Delta n = 0$ |

Figure 3A:
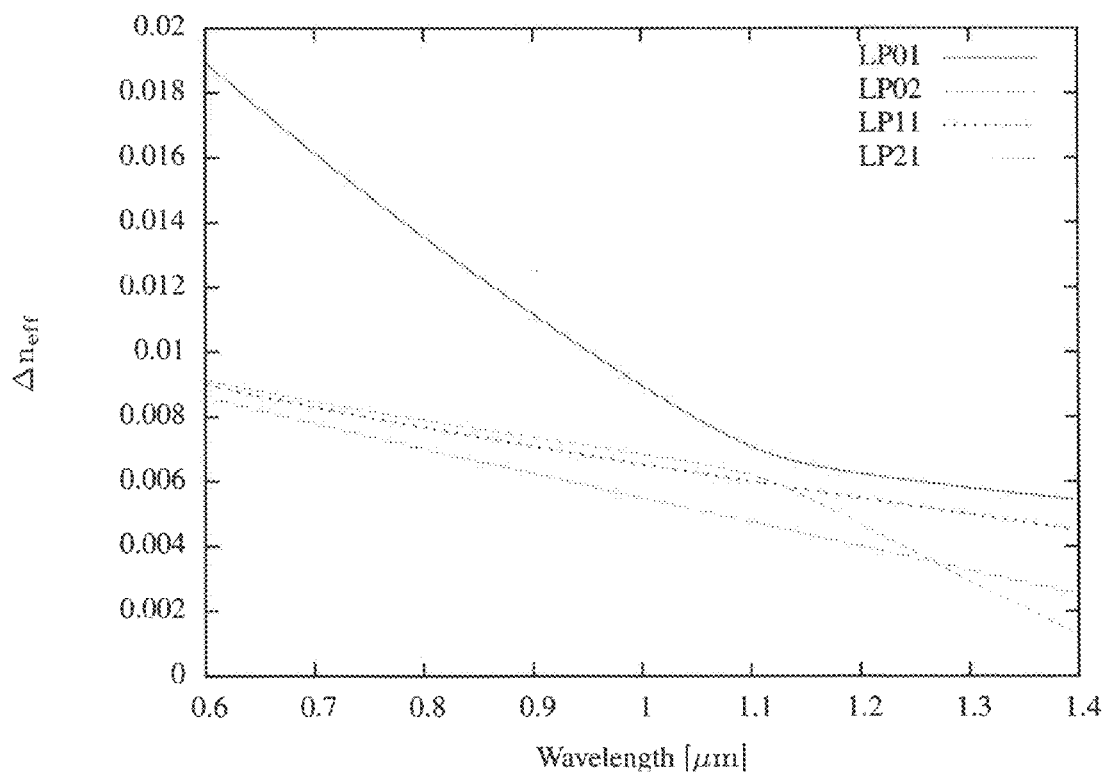
FIG. 3A depicts a graph showing effective indices of guided modes for a first fiber in accordance with one embodiment of the present invention.
Figure 3B:
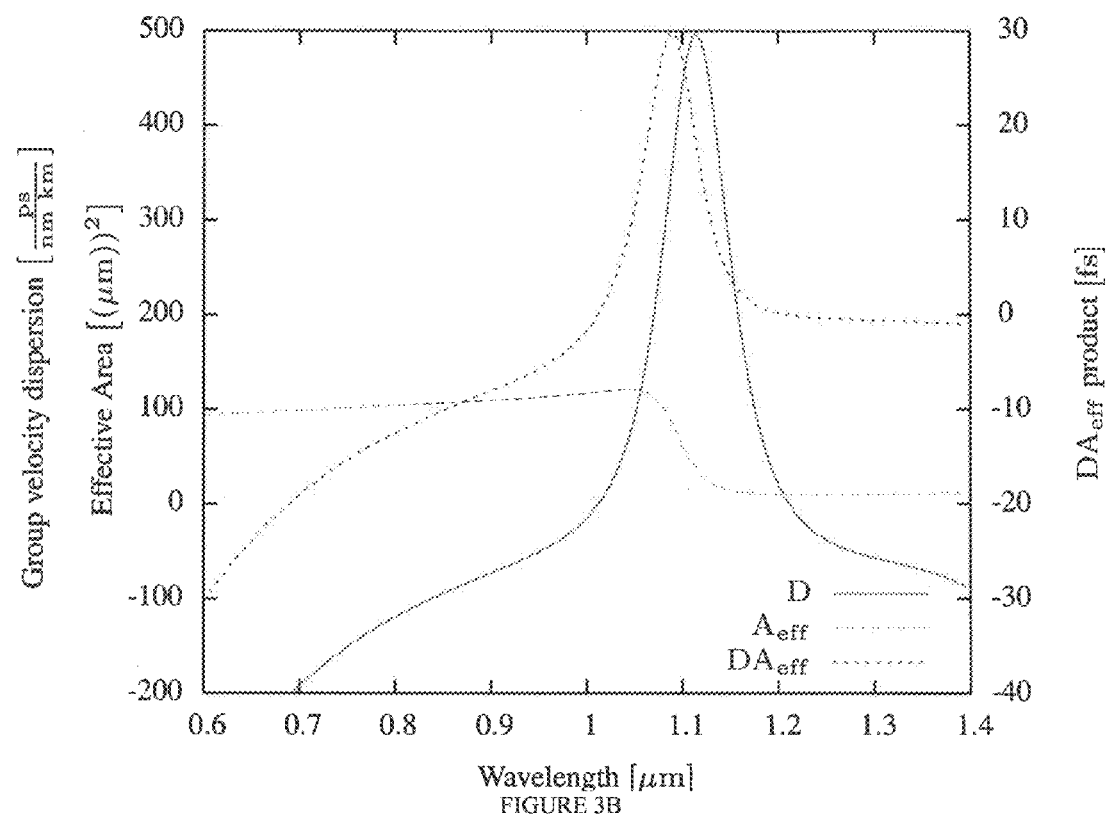
FIG. 3B depicts a graph showing dispersion and effective area for the first fiber as shown in FIG. 3A.
Figure 3C:
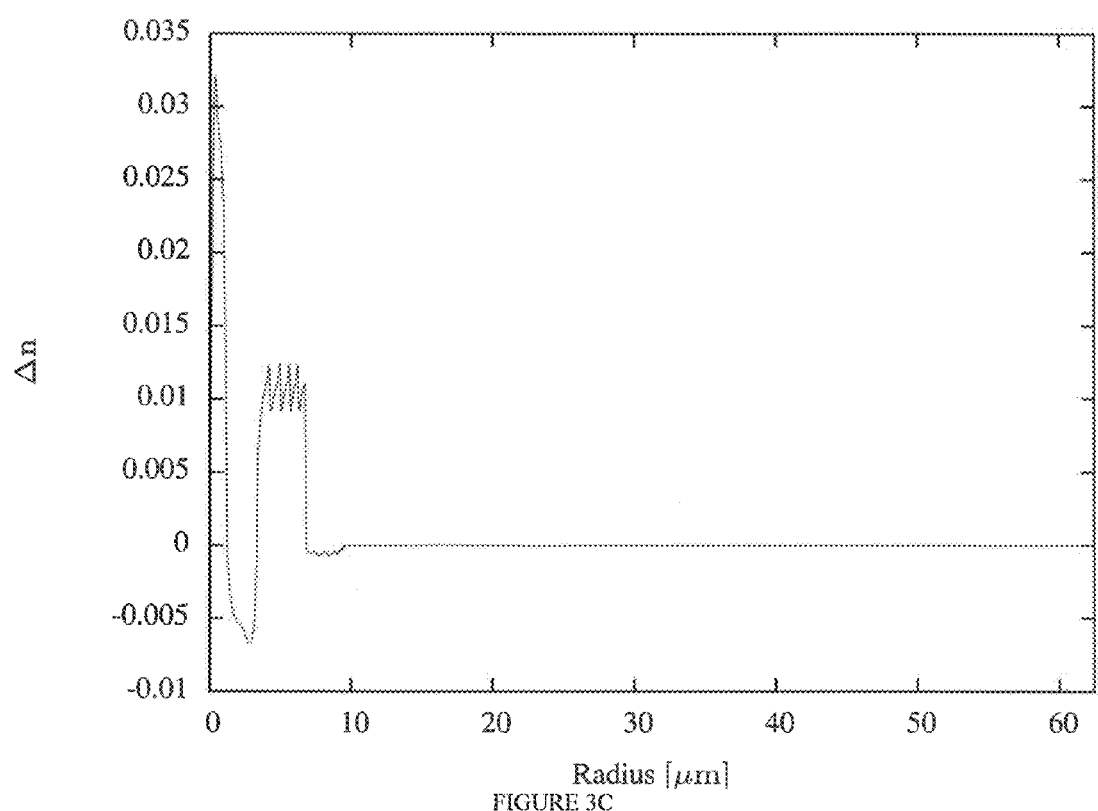
FIG. 3C depicts a graph showing a refractive index profile for the first fiber as shown in FIG. 3A.

FIGS. 3A-3C depict graphs showing the effective indices of guided modes, the dispersion and effective area, and a refractive index profile for a first designed fiber in accordance with one embodiment of the present invention.

Regarding the index profile of the second designed fiber, such fiber also comprises a central core, an inner trench surrounding the core, a ring surrounding the trench, an outer trench surrounding the ring, and an outer cladding. In some embodiments, the central core of the second designed fiber may generally have a raised index region, having a radius of between about 0.85 µm to about 2.25 µm, and having an index difference to the outer cladding of between about 20.0 to about 40.0 (measured in $10^{-3}$). The central core may generally comprise $SiO_2$ doped with an appropriate amount of $GeO_2$ to achieve a desired index.

The inner trench of the second designed fiber may be a depressed index region, having a width of between about 0.5 µm to 2.5 µm, and having an index difference to the outer cladding of between about 0.0 to about −13.0 (measured in $10^{-3}$). The inner trench may generally comprise $SiO_2$ doped with the appropriate amount of F, and optionally $GeO_2$, to achieve a desired index.

The ring of the second designed fiber may be a raised index region, having a width of between about 2.0 µm to 4.5 µm, and having an index difference to the outer cladding of between about 5.0 to about 20.0 (measured in $10^{-3}$). The ring may generally comprise $SiO_2$ doped with the appropriate amount of $GeO_2$, and optionally F, to achieve a desired index.

The outer trench generally has a width of between about 1.75 µm to 4.5 µm, and has an index difference to the outer cladding of between about 1.5 to about −5.0 (measured in $10^{-3}$). The outer trench may generally comprise $SiO_2$ doped with the appropriate amount of $P_2O_5$, F, and optionally $GeO_2$, to achieve a desired index.

In many embodiments, the outer cladding comprises $SiO_2$, and has an outer radius of between about 50 µm to about 75 µm.

The specific design of one exemplary second designed fiber is shown in Table 2 below:

TABLE 2

Exemplary Second Designed Fiber
The RS3 fiber

| Region | Dimension | Index difference to outer cladding |
|---|---|---|
| Core | Radius = 1.35 µm | $\Delta n = 28.5 \cdot 10^{-3}$ |
| Trench | Width = 1.10 µm | $\Delta n = -0.4 \cdot 10^{-3}$ |
| Ring | Width = 3.15 µm | $\Delta n = 9.6 \cdot 10^{-3}$ |
| Cladding | Width = 3.09 µm | $\Delta n = -0.5 \cdot 10^{-3}$ |
| Outer Cladding | Radius = 62.5 µm | $\Delta n = 0$ |

Figure 4A:
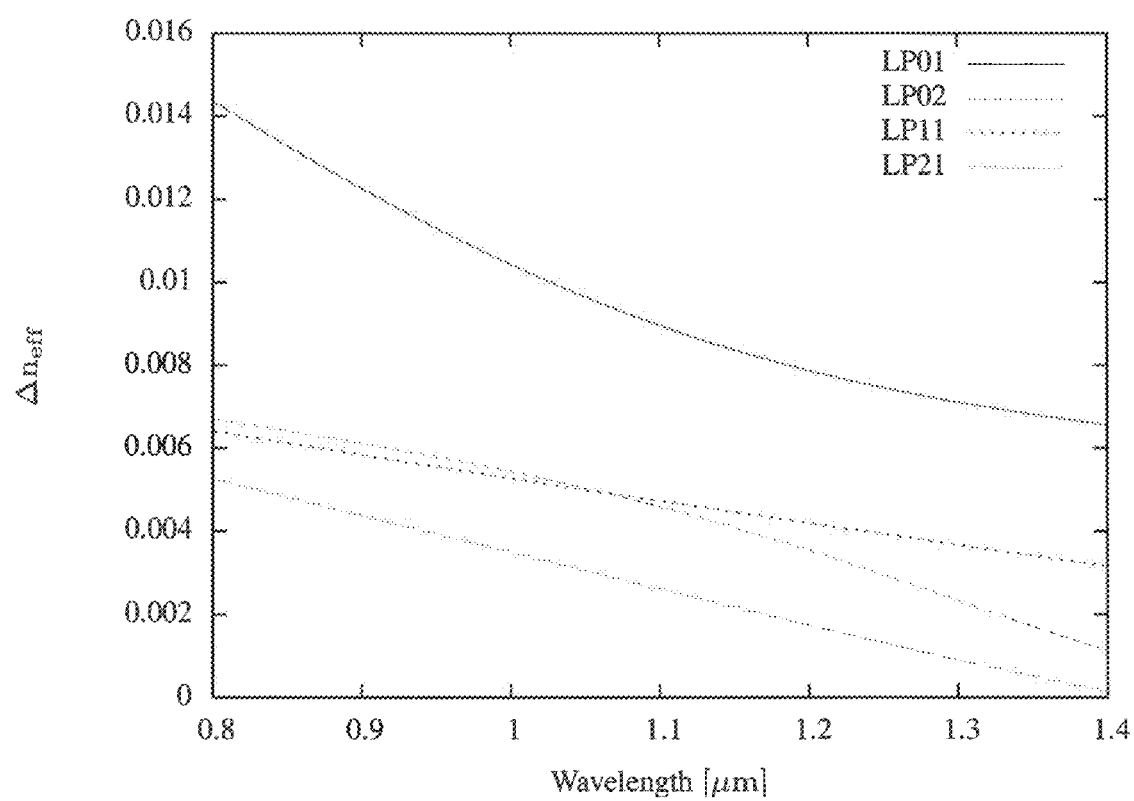
FIG. 4A depicts a graph showing effective indices of guided modes for a second fiber in accordance with one embodiment of the present invention.
Figure 4B:
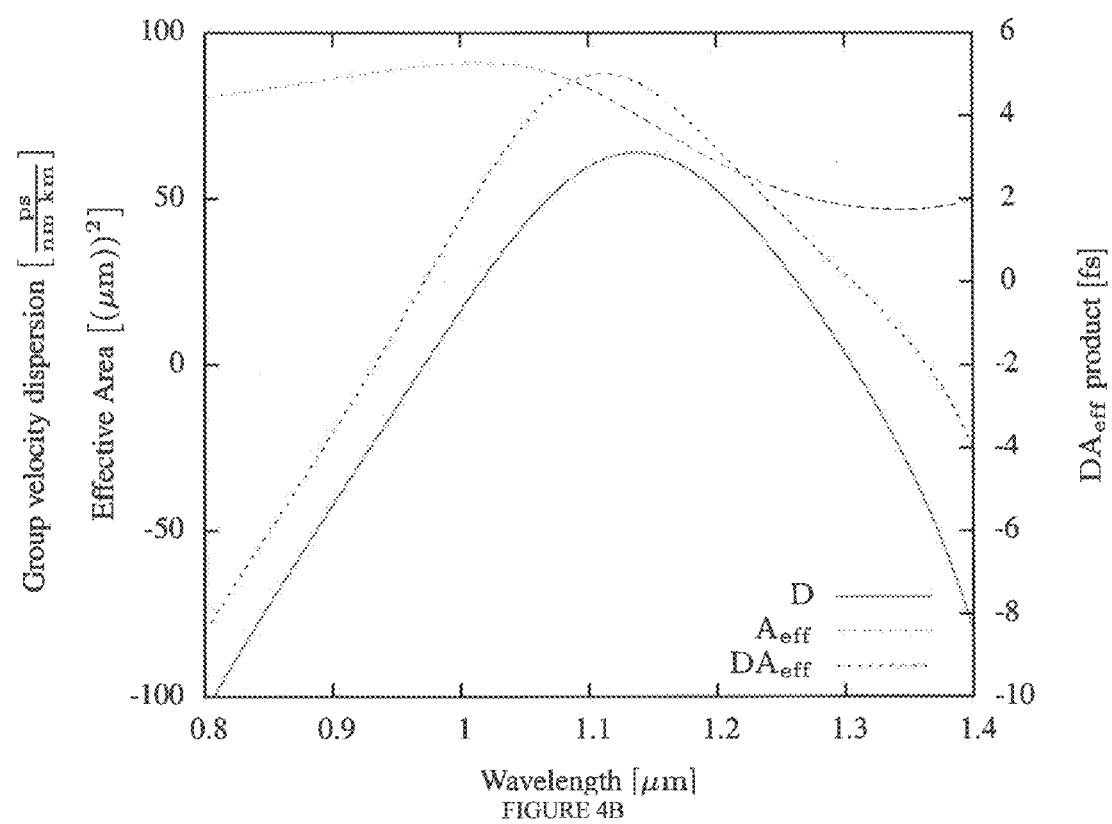
FIG. 4B depicts a graph showing dispersion and effective area for the second fiber as shown in FIG. 4A.
Figure 4C:
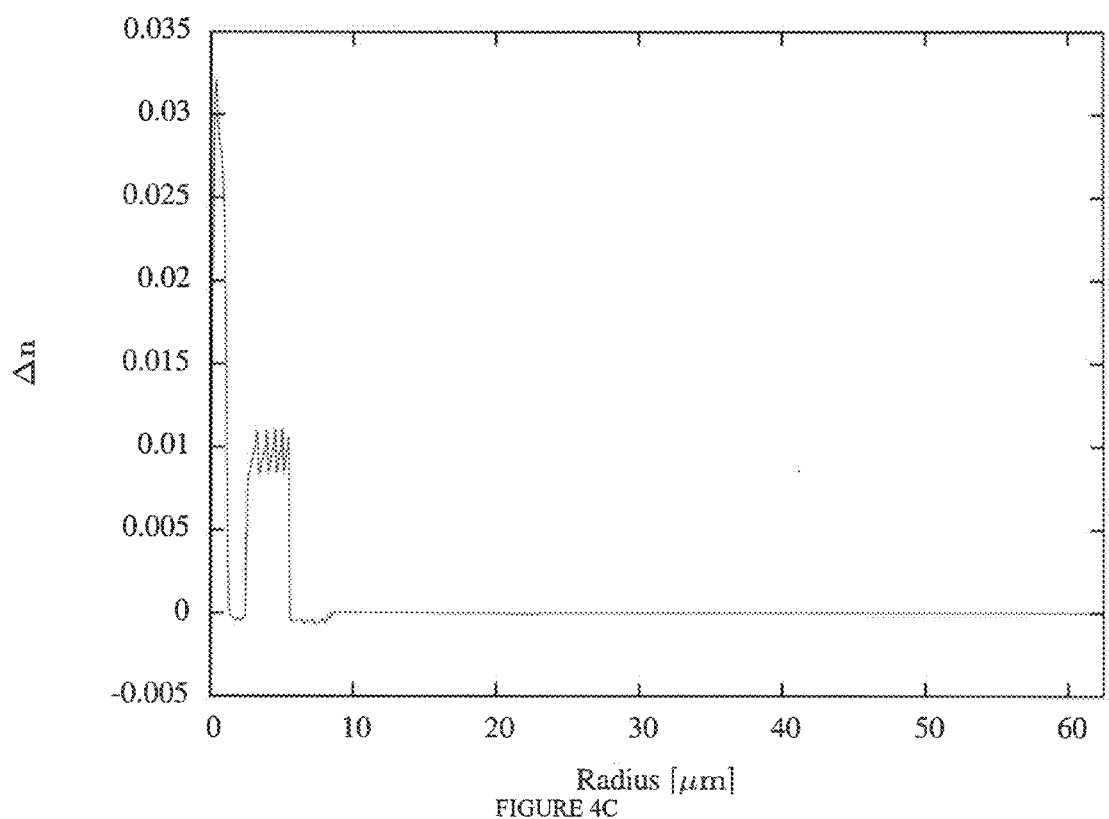
FIG. 4C depicts a graph showing a refractive index profile for the second fiber as Shown in FIG. 4A.

FIGS. 4A-4C depict graphs showing the effective indices of guided modes, the dispersion and effective area, and a refractive index profile for a second designed fiber in accordance with one embodiment of the present invention.

For the exemplary embodiment depicted between FIGS. 3A-3C and FIGS. 4A-4C, for the first designed fiber and the second designed fiber, respectively, an analysis was conducted on the overall performance of the SSFS with the fibers. The considered shift wavelength in the exemplary embodiment was set at approximately 1100 nm, and the largest possible output wavelength of the soliton was approximately 1.300 nm. From the Figures, it can be noted that the first designed fiber has a $D \cdot A_{eff} = 17$ fs at 1060 nm, i.e., approx. the pump wavelength, however the pump wavelength is not limited to 1060 nm; rather any wavelength where the first designed fiber has anomalous dispersion could be used. In various embodiments of the present invention, the $D \cdot A_{eff}$ is greater than 3 fs at the pump wavelength.

At the exemplary shift wavelength of 1100 nm where the energy goes from the first designed fiber to the second designed fiber, $D \cdot A_{eff}$ is approximately 27 fs and 5 fs, for the first designed fiber and the second designed fiber, respectively. Accordingly, the $D \cdot A_{eff}$ ratio is approximately 5.4

Figure 5:
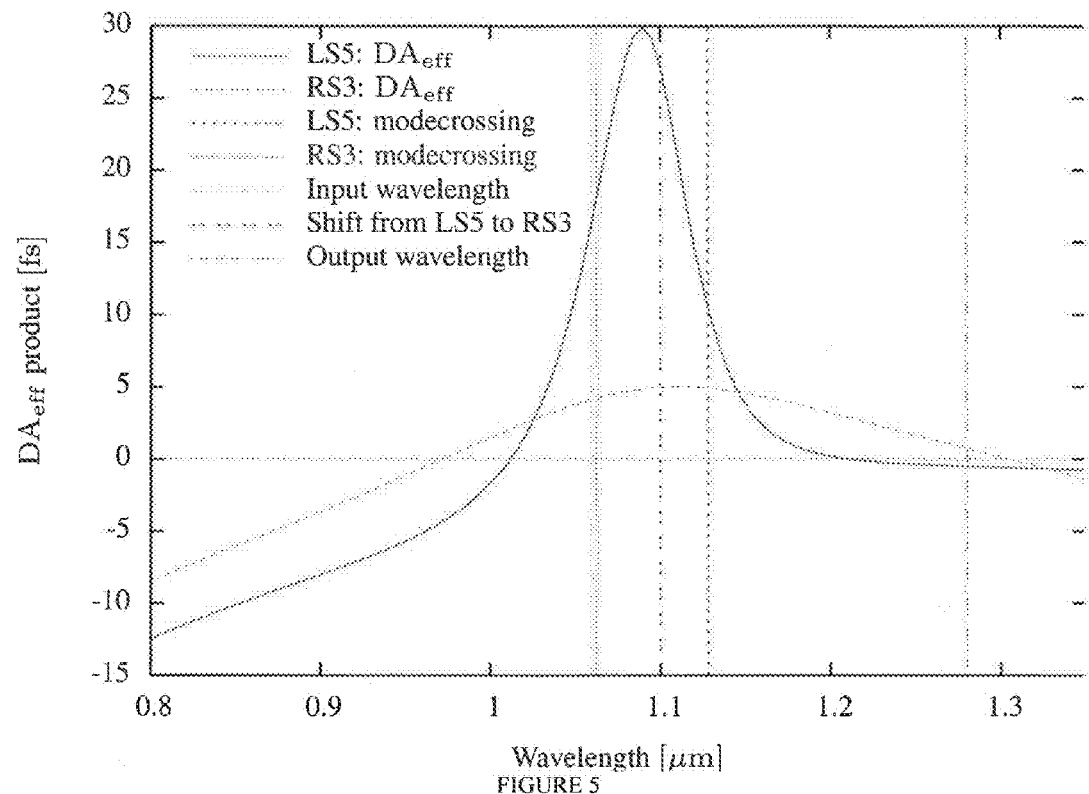
FIG. 5 depicts a graph showing dispersion and effective area for a system utilizing fiber designs in accordance with embodiments of the present invention.

FIG. 5 depicts a graph showing dispersion and effective area for a system utilizing fiber designs in accordance with embodiments of the present invention. As shown in FIG. 5, light is coupled into the first designed fiber in the $LP_{02}$ mode. For the depicted embodiment, this is done at a wavelength of 1060 nm, but could be any wavelength as long the $D \cdot A_{eff}$ product is positive as it implies that the dispersion is anomalous.

Depending on the pulse energy and the pulse duration the light will form a soliton. If the soliton is of order 1, it will start to shift towards longer wavelengths due to the SSFS. If the order of the formed soliton in the LS5 fiber is greater than 1 and the duration is on a femtosecond time scale, then the pulse will undergo soliton fission and split up into N first order solitons, where N is the order of the formed higher order soliton, if the length of the fiber is long enough, where length is dependent upon the desired pulse energy, pulse shape, and duration, for this process to finish.

The order of the soliton is determined from the pulse energy soliton equation above, and could either be adjusted by a change in the pulse energy or in the pulse duration. The length of the first designed fiber should be such that the first of the fundamental soliton, which is split off from the fission process is shifted to a wavelength around 1100 nm.

For the exemplary embodiment, 1100 nm is the target wavelength for the coupling from the first designed fiber into the second designed fiber, as this is limited by the mode-crossing in order to avoid mode coupling to other modes. However, the actual wavelength can vary several nm, depending on the input pulse energy and pulse duration, which is used to control the shift of the output soliton in the second designed fiber. The target wavelength for the coupling between the first designed fiber and second designed fiber is therefore placed approximately 20 nm away from the mode-crossing between the $LP_{02}$ and $LP_{11}$ mode to account for a possible longer coupling wavelength. When the light is coupled from the first designed fiber to the second designed fiber, it will likely form a higher order soliton in the second designed fiber as the $D \cdot A_{eff}$ product in the second designed fiber is lower than in the first designed fiber.

In many embodiments, it is important that the $D \cdot A_{eff}$ product in the second designed fiber is not higher than in the first designed fiber as this will make it difficult to form a soliton in the second designed fiber. However, a small difference could be tolerated because as the pulse disperses, the pulse duration increases, which lowers the required pulse energy to form a soliton.

It is also important that the soliton order is not too high as this will create a broadband supercontinuum spectrum. A higher order soliton in the second designed fiber will once more undergo fission and separate out a fundamental soliton which will continue to shift towards longer wavelengths. The final wavelength of this soliton can be adjusted by the input pulse energy or pulse duration if the length is fixed within the region where the $D \cdot A_{eff}$ product is non-negative in the second designed fiber. As shown in FIG. 5, the target output wavelength is set to 1280 nm.

It should be noted that the intended operation region in the first designed fiber is on the left side of FIG. 5 of the mode-crossing between the $LP_{02}$ and $LP_{11}$ mode, and that the intended operation region in the second designed fiber is on the right hand side of FIG. 5 of the mode-crossing between the $LP_{02}$ and $LP_{11}$ mode.

In accordance with embodiments of the present invention, the proposed steps of using the higher order mode fibers to obtain anomalous dispersion are not restricted to the considered wavelength region, but are, in fact, a general method that could be applied at any wavelength. Thus, with the right combination of pump source and higher order modes fibers, it should be possible to generate light at any desire wavelength.

As depicted by FIG. 5, simulations show that for a pump energy at 1064 nm of 10 nJ in a sech² pulse with full-width-half-max duration of 400 fs, a soliton is generated at 1099 nm with an energy of 6.82 nJ after propagation in 0.22 m of a first designed fiber. It is assumed that a splice loss of 0.5 dB occurs between the first designed fiber and the second designed fiber. After a further 0.07 m of propagation in the second designed fiber, a pulse of 4.36 nJ is generated at 1213 nm.

Experimental Embodiment

Further to the exemplary embodiments discussed above, an experiment was conducted utilizing one embodiment of the present invention. As set forth in the experiment, a new HOM fiber was fabricated according to the design criteria set forth herein, and the resulting soliton had a temporal duration of 216 fs and a pulse energy of 6.3 nJ at a wavelength of 1085 nm. The demonstrated pulse energy was approximately six times higher than the previous record in a solid silica fiber at wavelengths below 1300 nm.

The resulting HOM fiber also provided better pulse energy for the considered tuning range with fs operation than current Yb fiber-laser systems. The soliton energy is directly proportional to the $D_{Aeff}$ product. Thus, to increase the soliton energy, it was a matter of designing a fiber with a very large anomalous dispersion and/or a large effective mode area for the mode where the soliton propagates. The experiment focused on the $LP_{02}$ mode in the HOM fiber. To enhance the waveguide dispersion of the $LP_{02}$ mode, the fiber had a triple clad design. The parameter space of the design of the HOM fiber had been thoroughly investigated by running numerous computations of different configurations to find the optimum design for the highest soliton energy.

Figure 6:
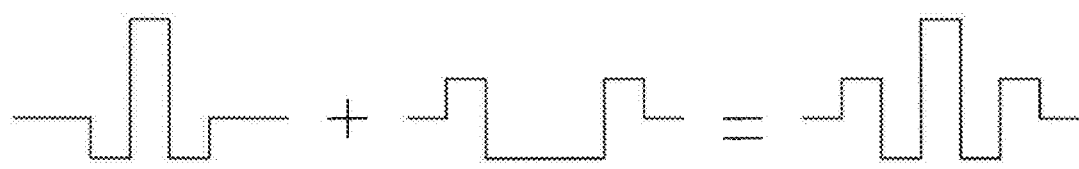
FIG. 6 depicts a schematic refractive index profile of a core and the ring waveguides that make up a triple clad waveguide in accordance with one experimental embodiment of the present invention.

The optimized design was a compromise of soliton energy and the wavelength range for SSFS. An intuitive explanation is offering in regarding the scaling of the group velocity dispersion for the $LP_{01}$ mode in a triple clad design, which also applies for the $LP_{02}$ mode. The triple clad design can be viewed as a superposition of two waveguides, a core waveguide and a ring waveguide, as shown in FIG. 6.

Figure 7:
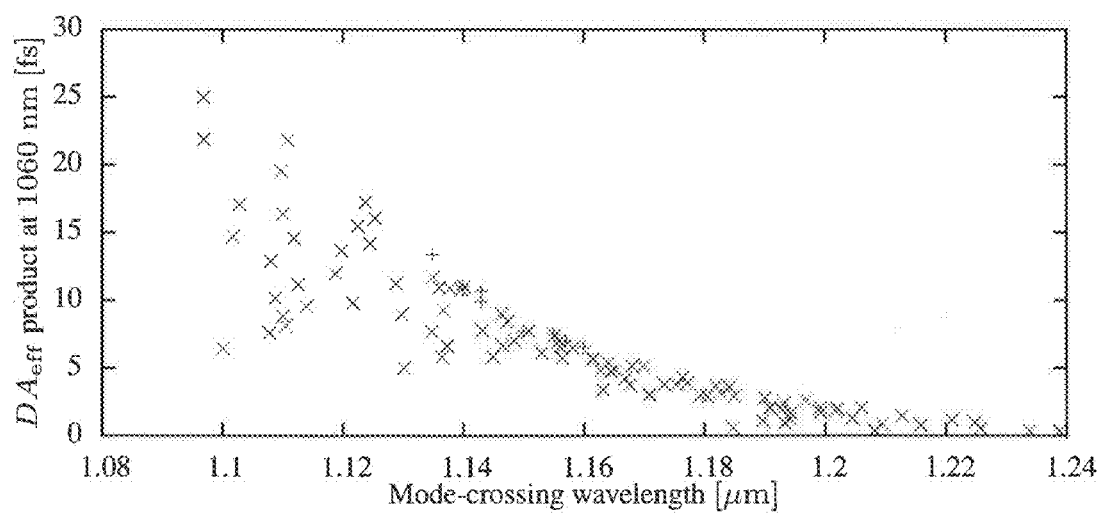
FIG. 7 depicts a graph showing mode-crossing wavelength as a function of the $D_{Aeff}$ product at wavelength of 1060 nm for a number of different waveguide perturbations in accordance with the experimental embodiment of FIG. 6.

The area under the D curve, (for example, as can be seen in FIGS. 3B and 4B), between the two zero dispersion wavelengths can be regarded as a constant given by the difference in group index of the core waveguide and the ring waveguide. Therefore, a larger peak D leads to a narrower wavelength region where the dispersion is anomalous. As the peak of the D curve is increased, the effective index for the $LP_{02}$ mode and $LP_{11}$ mode crosses at a wavelength closer to the peak of the D curve. In FIG. 7, this mode-crossing wavelength as a function of the $D_{Aeff}$ product at the wavelength of 1060 nm is shown for a number of different waveguide perturbations.

Figure 8:
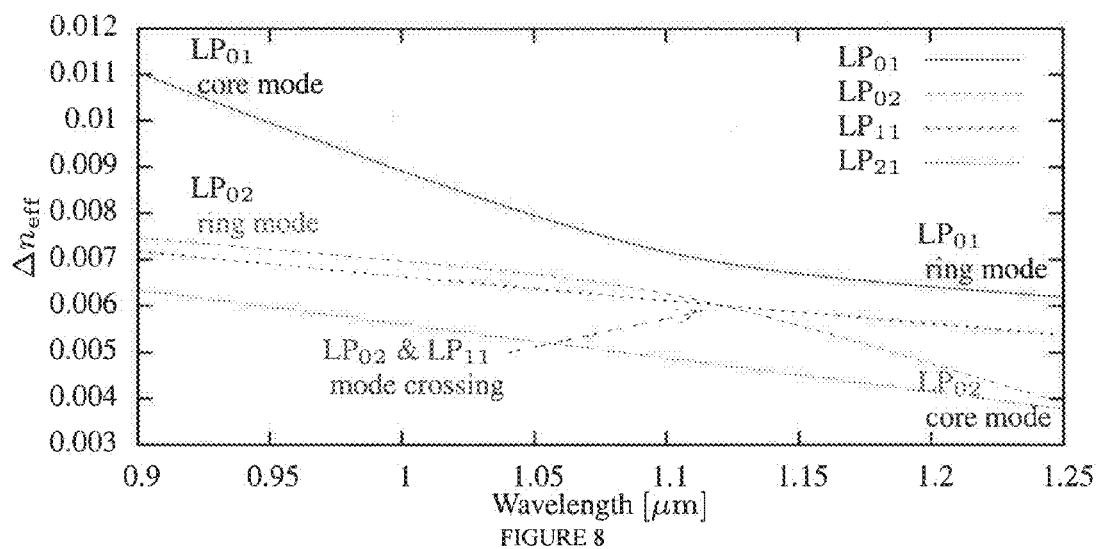
FIG. 8 depicts a graph showing effective indices of the lowest four propagating modes in the HOM fiber in accordance with the experimental embodiment of FIG. 6.

FIG. 7 shows that the mode-crossing wavelength moves closer to the input wavelength (i.e., ~1060 nm) as the $D_{Aeff}$ product increases, which is generally undesirable for a stable operation. Any imperfection in the fabrication process may result in a fiber without perfect cylindrical symmetry; therefore, any mode-crossing could likely create a strong coupling between the two modes. The mode-crossing limits the wavelength range in which the soliton can be formed and shifted without any significant loss. As a compromise between soliton energy and stability, the optimized experimental design had a mode-crossing between the $LP_{02}$ and $LP_{11}$ modes at around 1120 nm. FIG. 8 shows the effective indices as a function of wavelength for the first four LP modes of the chosen design for the HOM fiber.

Figure 9:
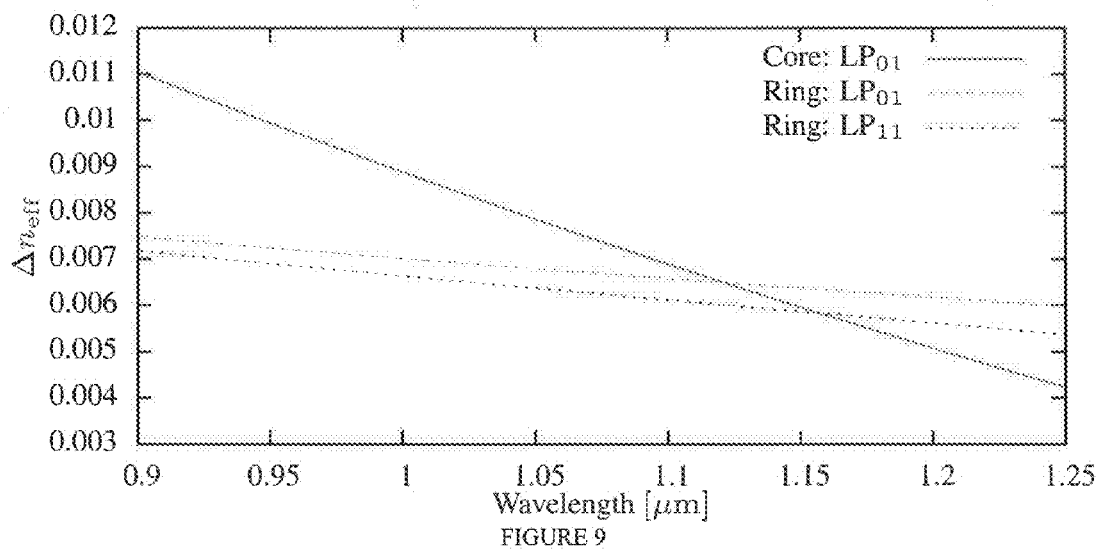
FIG. 9 depicts a graph showing the effective index for the $LP_{01}$ mode in the core waveguide and the effective indices for the $LP_{01}$ and $LP_{11}$ in the ring waveguide in accordance with the experimental embodiment of FIG. 6.

To show the decomposition of the triple clad design into a core and a ring waveguide, the effective indices as a function of wavelength are shown for the core and the ring waveguides in FIG. 9. The effective indices for the individual $LP_{01}$ modes in the core and ring waveguides cross at around 1120 nm. Because the core and ring waveguides are coupled waveguides in the triple clad design and they have the same angular symmetry, the two $LP_{01}$ modes are forced to make an avoided crossing to satisfy an orthogonality requirement, which may be seen by comparing FIGS. 8 and 9. The $LP_{02}$ mode starts out as the $LP_{01}$ mode of the isolated ring waveguide at the shorter wavelengths and ends up as the $LP_{01}$ mode of the isolated core waveguide at the longer wavelengths.

Figure 10:
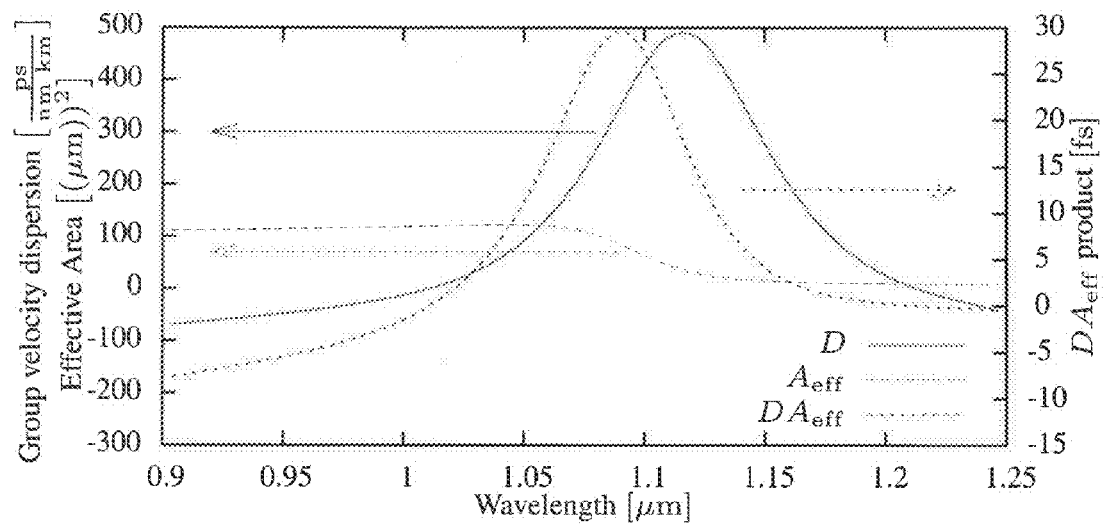
FIG. 10 depicts a graph showing Dispersion, effective area, and $D_{Aeff}$ product curves of the $LP_{02}$ mode in accordance with the experimental embodiment of FIG. 6.

Therefore, the mode-crossing between the $LP_{02}$ and $LP_{11}$ modes comes as an effect of the avoided crossing between the $LP_{01}$ and $LP_{02}$ modes. The closer the intersect angle between the two $LP_{01}$ modes in the isolated core and ring waveguides are to 90°, the larger the curvature the avoided crossing will, experience. The curvature in the effective index is substantially directly related to the dispersion value. However, from FIG. 9, the closer the intersect angle is to 90°, the closer the mode-crossing between the core $LP_{01}$ mode and the ring $LP_{11}$ mode is to the mode-crossing between the core $LP_{01}$ mode and the ring $LP_{01}$ mode. Thus, with the triple clad design there is a natural trade-off between a high anomalous dispersion value for the $LP_{02}$ mode and the position of the mode-crossing wavelength between the $LP_{02}$ and $LP_{11}$ modes FIG. 10 shows the group velocity dispersion and effective area of the $LP_{02}$ mode as well as the $D_{Aeff}$ product. FIGS. 8 and 10 show that the mode-crossing wavelength is very close to the wavelength at the peak of the D curve. For the Yb-based fiber laser system used as the pump, the left hand side of D curve for the SSFS should be used. In this optimization process, focus was limited to the LP02 mode; however, other HOMs also could be used. In general, the process would become more complex because more mode-crossings will be involved.

Figure 11:
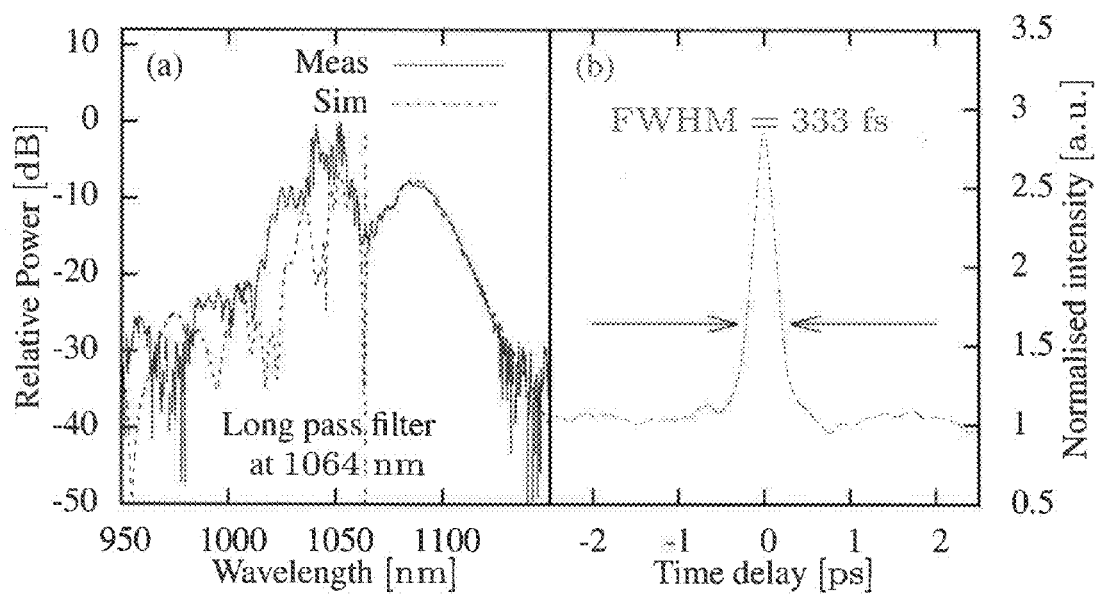
FIG. 11 depicts a graph showing measured spectrum with the shifted soliton pulse together with a simulation corresponding to the pulse propagation in the $LP_{02}$ mode, and corresponding measured intensity autocorrelation of the soliton pulse, in accordance with the experimental embodiment of FIG. 6.

As a result of the testing, a HOM fiber according to the design shown in FIG. 10 was fabricated. FIG. 11 shows the measured output spectrum after 25 cm of the optimized HOM fiber, where the input source is an IMRA FCPA µJewel system at a wavelength of 1045 nm. The FWHM pulse duration of the input pulse is approximately 600 fs, and the input pulse energy into the fiber is 23 nJ. Because the fiber is a HOM fiber and the pulse is coupled in from free space, only a fraction of the pulse energy is coupled into the $LP_{02}$ mode. The fraction is estimated to be 48% from the simulated pulse propagation in the LP02 mode shown in FIG. 11.

It was determined, for future applications, the excitation of the $LP_{02}$ mode may be more efficiently accomplished by using long period gratings. Nonetheless, the $LP_{02}$ mode is the only propagating mode with anomalous dispersion and therefore the only mode that can support a soliton pulse and the subsequent SSFS. FIG. 11 shows the soliton has shifted to a center wavelength of 1085 nm. The energy of the soliton is measured by recording the total power out of the fiber and the power through a long pass filter with the band edge at 1064 nm. This results in a soliton energy of 6.3 nJ, which is approximately six times higher than the previous record in a solid core fiber at wavelengths below 1300 nm. The pulse duration of the soliton pulse is measured by using second order intensity autocorrelation, and the FWHM is 216 fs, assuming a $sech^2$ pulse profile. The autocorrelation measurement was done with the long pass filter in place.

The theoretical $D_{Aeff}$ product at 1085 nm is 29 fs, which together with the measured pulse duration yields a fundamental soliton pulse energy of 6.3 nJ. The resulting HOME fiber also provides better pulse energy for the considered tuning range with fs operation than current Yb fiber-laser systems and, with the possibility to engineer both the wavelength and bandwidth of the anomalous region. The HOM fiber provides a more flexible design platform. In conclusion, an optimized HOM fiber was designed to achieve an energetic soliton pulse having a temporal FWHM of 216 fs and a record pulse energy of 6.3 nJ in a solid core fiber at wavelengths below 1300 nm.

While the foregoing is directed to embodiments of the present invention, other and further embodiments of the invention may be devised without departing from the basic scope thereof. It is also understood that various embodiments described herein may be utilized in combination with any other embodiment described, without departing from the scope contained herein. In addition, embodiments of the present invention may be further scalable, as particular applications may require.

What is claimed is:

1. A wavelength tunable short pulse fiber laser system comprising:
    a pulse generator for providing a pulse having an input wavelength;
    a mode converter comprising a higher order mode fiber;
    a first designed higher order mode fiber for shifting the pulse from the input wavelength to a transfer wavelength; and
    a second designed higher order mode fiber for shifting the pulse from the transfer wavelength to an output wavelength,
    wherein the first designed fiber uses a higher order mode having $D \cdot A_{eff}$ greater than 3 fs at the input wavelength, wherein D is the dispersion coefficient of the fiber and $A_{eff}$ is the effective area of the fiber;

wherein a ratio of the $D \cdot A_{eff}$ of the first designed fiber and a $D \cdot A_{eff}$ of the second designed fiber is less than a factor of 100;

wherein an effective index of a higher order mode of the first designed fiber does not overlap the effective index of any other guided mode of the first designed fiber at a wavelength range between the input wavelength and the transfer wavelength;

wherein an effective index of a higher order mode of the second designed fiber does not overlap the effective index of any other guided mode of the second designed fiber at a wavelength range between the transfer wavelength and the output wavelength.

2. The system of claim 1, wherein the pulse generator comprises a mode-locked laser.

3. A wavelength tunable short pulse fiber laser system comprising:

a mode-locked laser for providing a pulse having an input wavelength;

a long period grating mode converter;

a first designed HOM fiber for shifting the pulse from the input wavelength to a transfer wavelength; and a second designed HOM fiber for shifting the pulse from the transfer wavelength to an output wavelength;

wherein the first designed fiber uses a higher order mode having $D \cdot A_{eff}$ greater than 3 fs at the input wavelength; and wherein D is the dispersion coefficient of the fiber and Aeff is the effective area of the fiber;

wherein a ratio of the $D \cdot A_{eff}$ of the first designed HOM fiber and a $D \cdot A_{eff}$ of the second designed HOM fiber is less than a factor of 100;

wherein an effective index of a higher order mode of the first designed fiber does not overlap the effective index of any other guided mode of the first designed fiber at a wavelength range between the input wavelength and the transfer wavelength;

wherein an effective index of a higher order mode of the second designed fiber does not overlap the effective index of any other guided mode of the second designed fiber at a wavelength range between the transfer wavelength and the output wavelength;

wherein the first designed HOM fiber comprises a central core, a trench surrounding the core, a ring surrounding the trench, an outer trench surrounding the ring, and an outer cladding;

wherein the central core has a radius of between about 0.75 µm to about 2.0 µm, the trench has a width of between about 1.75 µm to 2.5 µm, the ring has a width of between about 2.0 µm to 5.0 µm, the outer trench has a width of between about 1.75 µm to 4.5 µm, and the outer cladding has an outer radius of between about 50 µm to about 75 µm.

4. A method of wavelength shifting ultra-short pulses comprising:

providing a system comprising:

a pulse generator for providing a pulse having an input wavelength;

a mode converter comprising a higher order mode fiber;

a first designed higher order mode fiber; and a second designed higher order mode fiber;

propagating the pulse from the pulse generator to the mode converter and converting the pulse from an input mode to a higher order mode;

propagating the pulse from the mode converter fiber to the first designed higher order mode fiber and shifting the input wavelength to a transfer wavelength; and propagating the pulse from the first designed higher order mode fiber and to the second designed higher order mode fiber and shifting the transfer wavelength to an output wavelength;

wherein the first designed fiber at the higher order mode has a $D \cdot A_{eff}$ greater than 3 fs at the input wavelength, wherein D is the dispersion coefficient of the fiber and $A_{eff}$ is the effective area of the fiber;

wherein an effective index of a higher order mode of the first designed fiber does not overlap the effective index of any other guided mode of the first designed fiber at a wavelength range between the input wavelength and the transfer wavelength; and wherein an effective index of a higher order mode of the second designed fiber does not overlap the effective index of any other guided mode of the second designed fiber at a wavelength range between the transfer wavelength and the output wavelength.

* * * * *